US012071538B2

(12) United States Patent
Berdin et al.

(10) Patent No.: US 12,071,538 B2
(45) Date of Patent: Aug. 27, 2024

(54) TRANSPARENT AND ANTISTATIC PMMA COMPOSITION

(71) Applicant: ARKEMA FRANCE, Colombes (FR)

(72) Inventors: Laure Berdin, Bernay (FR); Damien Rauline, Saint-Quentin-des-Isles (FR); Karine Loyen, Pont-Audemer (FR); Frederic Malet, Lyons (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/113,258

(22) Filed: Aug. 27, 2018

(65) Prior Publication Data

US 2019/0062545 A1   Feb. 28, 2019

Related U.S. Application Data

(63) Continuation of application No. 14/783,611, filed as application No. PCT/FR2014/050711 on Mar. 26, 2014, now abandoned.

(30) Foreign Application Priority Data

Apr. 10, 2013   (FR) ..................................... 1353244

(51) Int. Cl.
| | |
|---|---|
| C08L 33/12 | (2006.01) |
| C08L 53/00 | (2006.01) |
| C08L 71/00 | (2006.01) |
| C08L 77/00 | (2006.01) |
| C09K 3/16 | (2006.01) |

(52) U.S. Cl.
CPC ............... *C08L 33/12* (2013.01); *C08L 53/00* (2013.01); *C08L 71/00* (2013.01); *C08L 77/00* (2013.01); *C09K 3/16* (2013.01)

(58) Field of Classification Search
None
See application file for complete search history.

(56) References Cited

U.S. PATENT DOCUMENTS

| | | | |
|---|---|---|---|
| 4,839,441 A | 6/1989 | Cuzin | |
| 6,525,134 B1 | 2/2003 | Lacroix et al. | |
| 6,784,257 B2 * | 8/2004 | Hilgers | C08L 77/12 525/420 |
| 2005/0049360 A1 * | 3/2005 | Okamoto | C08L 23/02 525/88 |
| 2005/0165210 A1 | 7/2005 | Malet et al. | |
| 2012/0108694 A1 | 5/2012 | Malet et al. | |
| 2013/0022771 A1 * | 1/2013 | Malet | C07D 301/02 428/36.9 |
| 2014/0107238 A1 | 4/2014 | Ong et al. | |

FOREIGN PATENT DOCUMENTS

| | | |
|---|---|---|
| EP | 1482011 A1 | 12/2004 |
| FR | 2 846 332 A1 | 4/2004 |
| JP | 60-23435 A | 2/1985 |
| JP | 3-237149 A | 10/1991 |
| JP | 4-146947 A | 5/1992 |
| JP | 04146947 A * | 5/1992 |
| JP | 5-78543 A | 3/1993 |
| JP | 5-287157 A | 11/1993 |
| JP | 5-295213 A | 11/1993 |
| JP | H08-120147 A | 5/1996 |
| JP | 8-253640 A | 10/1996 |
| JP | 2003-508622 A | 3/2003 |
| JP | 2004346274 A | 12/2004 |
| JP | 2004352794 A | 12/2004 |
| JP | 2012 516902 A | 7/2012 |
| JP | 2015-516902 A | 6/2015 |
| KR | 10-2001-0099799 A | 11/2001 |
| KR | 10-2011-0115415 A | 10/2011 |
| WO | 01/18111 A2 | 3/2001 |
| WO | 2010/086574 A2 | 8/2010 |
| WO | 2011/124833 A1 | 10/2011 |

OTHER PUBLICATIONS

Office Action (Decision of Refusal) issued on Mar. 15, 2018, by the Japanese Patent Office in corresponding Japanese Patent Application No. 2016-507027, and an English Translation of the Office Action. (9 pages).
International Search Report (PCT/ISA/210) mailed on May 16, 2014, by the French Patent Office as the International Searching Authority for International Application No. PCT/FR2014/050711.
Car et al. PEG modified poly(amide-b-ethylene oxide) membranes for CO2 separation. Journal of Membrane Science 307 (2008), 88-95 (Year: 2008).
Decision to grant received for European Patent Application No. 14719045, mailed on Mar. 23, 2017, 2 pages.
Decision to Grant received for Japanese Patent Application No. 2018-134093, mailed on May 19, 2020, 5 pages (2 pages of English Translation and 3 pages of Original Document).
Didden et al. Blending PPO-based molecules with Pebax MH 1657 in membranes for gas separation. J. Appl. Polym. Sci. (Year: 2018).
Intention to grant received for European Patent Application No. 14719045, mailed on Aug. 25, 2016, 6 pages.
Intention to grant received for European Patent Application No. 14719045, mailed on Feb. 1, 2017, 6 pages.

(Continued)

*Primary Examiner* — Tanisha Diggs
(74) *Attorney, Agent, or Firm* — Boone IP Law (57) ABSTRACT

A transparent antistatic composition based on polymethyl methacrylate (PMMA), including: 55% to 99.9% by weight of PMMA, and 0.1% to 45% by weight of at least one polyamide (PA) block-containing and polyether (PE) block-containing copolymer (PEBA) including polyethylene glycol (PEG), with respect to the total composition weight, said copolymer being characterized in that it includes in the range 50% to 80% by weight of PEG with respect to the total weight of copolymer.

15 Claims, 2 Drawing Sheets

(56) References Cited

OTHER PUBLICATIONS

International Preliminary Report on Patentability received for PCT Patent Application No. PCT/FR2014/050711, mailed on Oct. 22, 2015, 11 pages (6 pages of English Translation and 5 pages of Original Document).
Notice of Allowance received for Korean Patent Application No. 10-2017-7036859, mailed on Apr. 14, 2020, 4 pages (2 pages of English Translation and 2 pages of Original Document).
Office Action received for Japanese Patent Application No. 2016-507027, mailed on Jan. 22, 2019, 33 pages (15 pages of English Translation and 18 pages of Original Document).
Office Action received for Japanese Patent Application No. 2016-507027, mailed on Sep. 5, 2017, 12 pages (6 pages of English Translation and 6 pages of Original Document).
Office Action received for Japanese Patent Application No. 2018-134093, mailed on May 7, 2019, 12 pages (6 pages of English Translation and 6 pages of Original Document).
Office Action received for Korean Patent Application No. 10-2015-7031896, mailed on Feb. 15, 2017, 15 pages (8 pages of English Translation and 7 pages of Original Document).
Office Action received for Korean Patent Application No. 10-2015-7031896, mailed on Sep. 27, 2017, 7 pages (4 pages of English Translation and 3 pages of Original Document).
Office Action received for Korean Patent Application No. 10-2017-7036859, mailed on Jan. 9, 2020, 7 pages (4 pages of English Translation and 3 pages of Original Document).
Office Action received for Korean Patent Application No. 10-2017-7036859, mailed on Jun. 13, 2019, 9 pages (5 pages of English Translation and 4 pages of Original Document).

* cited by examiner

Figure 1

Graph 1: Surface resistivity (log SR) for various compositions: 100% PMMA or 80% PMMA/20% PEBA

Figure 2

Graph 2: Haze = $f$(quantity of copolymer)

TRANSPARENT AND ANTISTATIC PMMA COMPOSITION

CROSS REFERENCE TO RELATED APPLICATIONS

The present application is a continuation of U.S. application Ser. No. 14/783,611, filed on Oct. 9, 2015, which is a U.S. national stage of International Application No. PCT/FR2014/050711, filed on Mar. 26, 2014, which claims the benefit of French application No, 1353244, filed on Apr. 10, 2013. The entire contents of each of U.S. application Ser. No. 14/783,611 and International Application No. PCT/FR2014/050711, and French application No. 1353244 are hereby incorporated herein by reference in their entirety.

TECHNICAL FIELD

The present invention relates to a transparent antistatic composition based on polymethyl methacrylate (PMMA).
In the context of the invention:
"composition based on polymethyl methacrylate (PMMA)" means a composition comprising 55% to 99.9% by weight of PMMA;
"transparent composition" means a composition with a transmittance of at least 88% in accordance with the standard ASTM D1003-97/ISO 13468, and a haze of less than 15%, preferably less than 10%, preferably less than 5%, in accordance with the standard ASTM D1003-97, these two properties being measured at 560 nm using a 2 mm thick plate;
"antistatic composition" means a composition with a surface resistivity of less than $10^{12}$ ohm/square measured in accordance with the standard ASTM D257.

KNOWN ART

The surface of the majority of plastic materials are known to form and retain a static electricity charge. In the case of PMMA, during transport of granules of PMMA in particular, static electricity formation on the PMMA granules means that these granules stick to each other, making them difficult to separate, and they form a block which, for example, makes unloading of the granules problematic. The presence of static electricity on transparent PMMA items may cause dust to accumulate on these items, thus impairing their use and their esthetic appearance. On an industrial scale, residual PMMA powder also has a tendency to stick to machined parts. The accumulation of dust on the surface of these items alters their transparency.

The prior art has described antistatic agents such as ionic surfactants of the ethoxylated amine or sulfonate type which are added to the polymers. However, the antistatic properties of the polymers depend on the ambient humidity and they are not permanent, because these agents migrate to the surface of the polymers and disappear. Thus, copolymers with hydrophilic polyether and polyamide blocks have been proposed;

those agents have the advantage of not migrating and thus of providing permanent antistatic properties that, in addition, are independent of the ambient humidity.

Thus, the aim of the present invention is to make transparent PMMA permanently antistatic without altering its transparency.

Japanese patent application JP 60 023 435 A published on 6 Feb. 1985 describes antistatic compositions comprising 5% to 80% of polyetheresteramide and 95% to 20% of a thermoplastic resin selected, inter alia, from polystyrene, ABS and PMMA, that resin being functionalized by acrylic acid or maleic anhydride. Some examples show compositions constituted by 60 to 70 parts of carboxylated PMMA and 40 to 30 parts of polyetheresteramide (per 100 parts). Other examples show compositions consisting of 30 to 45 parts of carboxylated PMMA, 40 to 25 parts of PMMA and 30 parts of polyetheresteramide (per 100 parts). There is no mention of the transparency of PMMA-based compositions, and in addition, it is necessary to provide large quantities of carboxylated PMMA.

Japanese patent application JP 03 237 149 A published on 23 Oct. 1991 describes antistatic compositions consisting of 40% to 99% of an acrylic resin, 1% to 60% of polyetheresteramide and 0.2% to 15% of a grafted polymer having maleic anhydride or epoxy functions and a soluble portion in the acrylic resin. The graft polymer is complicated to prepare.

Japanese patent applications JP 08 253640 A published on 1 Oct. 1996 and JP 04 146 947 A published on 20 May 1992 describe antistatic and transparent compositions constituted by acrylic resin, polyetheresteramide and salts. Adding salts to compositions of this type is not desirable, as they can then migrate during use of the compositions.

Japanese patent applications JP 05 295 213 A published on 9 Nov. 1993 and JP 05 287 157 A published on 2 Nov. 1993 describe antistatic and transparent compositions constituted by acrylic resin, polyetheresteramide and an optional electrolyte or sulfonic acid. They suffer from the same disadvantage as the preceding compositions.

Japanese patent applications JP 05 078 543 A and JP 04 146 947 A describe antistatic and transparent compositions consisting of acrylic resin and polyetheresteramide. The mechanical properties of the basic resin are greatly altered.

Patent application EP 1144505 describes an antistatic composition with an improved impact resistance comprising, per 100 parts by weight: 5 to 20 parts of polyamide block-containing and polyether block-containing copolymer essentially comprising ethylene oxide motifs —($C_2H_4$—O)—; and 95 to 80 parts of (A)+(C), (A) being an acrylic polymer, (C) being a polymer selected from acrylic impact modifiers, copolymers (C1) with a low styrene content and an unsaturated carboxylic acid anhydride, copolymers (C2) of ethylene and an unsaturated carboxylic acid anhydride, copolymers (C3) of ethylene and an unsaturated epoxy or mixtures thereof. However, the observed properties in terms of surface resistivity have been shown to be insufficient and the transparency of the PMMA is greatly altered.

Thus, the aim of the present invention is to provide a transparent composition based on PMMA with permanent antistatic properties, which is ready for use and easy to implement, which does not suffer from the disadvantages of the prior art, and which has mechanical properties which are unmodified compared with PMMA.

Novel PMMA compositions have now been discovered that are both permanently antistatic and transparent. The Applicant has demonstrated that, surprisingly, adding a type of block copolymer comprising a total PEG content of more than 50% by weight to a PMMA matrix means that a PMMA can be obtained that has improved antistatic properties which are permanent while retaining the same transparency as the PMMA alone, as well as retaining its mechanical properties.

DETAILED DESCRIPTION

The present invention thus concerns a transparent antistatic composition based on polymethyl methacrylate (PMMA), comprising:
- 55% to 99.9% by weight of PMMA, and
- 0.1% to 45% by weight of at least one polyamide (PA) block-containing and polyether (PE) block-containing copolymer (PEBA) comprising polyethylene glycol (PEG), with respect to the total composition weight,
said copolymer being characterized in that it comprises in the range 50% to 80% by weight of PEG with respect to the total weight of copolymer.

Advantageously, said composition comprises:
- 65% to 97%, preferably 70% to 95%, preferably 80% to 93%, preferably 80% to 88%, preferably 85% to 88% by weight of PMMA, and
- 3% to 35%, preferably 5% to 30%, preferably 7% to 20%, preferably 12% to 20%, preferably 12% to 15% by weight of copolymer comprising PEG, with respect to the total composition weight.

Preferably, said copolymer comprises 55% to 75%, preferably 60% to 70% by weight of PEG with respect to the total weight of copolymer.

The term "PMMA" denotes a homopolymer or copolymer of methyl methacrylate (MMA) or mixtures thereof.

In one embodiment, the homo- or co-polymer of methyl methacrylate (MMA) comprises at least 70%, preferably at least 80%, advantageously at least 90% and more advantageously at least 95% by weight of methyl methacrylate.

In another embodiment, the PMMA is a mixture of at least one homopolymer and at least one copolymer of MMA, or a mixture of at least two homopolymers or two copolymers of MMA having different molecular weights, or a mixture of at least two MMA copolymers having different monomer compositions.

The methyl methacrylate copolymer (MMA) comprises 70% to 99.7% by weight of methyl methacrylate and 0.3% to 30% by weight of at least one monomer containing at least one ethylenically unsaturated bond which can copolymerize with the methyl methacrylate.

These monomers are well known; particular mention can be made of acrylic and methacrylic acids and alkyl (meth)acrylates in which the alkyl group contains 1 to 12 carbon atoms. By way of example, mention can be made of methyl acrylate and ethyl, butyl or 2-ethylhexyl (meth)acrylate. Preferably, the comonomer is an alkyl acrylate in which the alkyl group contains 1 to 4 carbon atoms.

In a preferred embodiment, the methyl methacrylate copolymer (MMA) comprises 80% to 99.7%, advantageously 90% to 99.7% and more advantageously 90% to 99.5% by weight of methyl methacrylate and 0.3% to 20%, advantageously 0.3% to 10% and more advantageously 0.5% to 10% by weight of at least one monomer containing at least one ethylenically unsaturated bond which can copolymerize with the methyl methacrylate. Preferably, the comonomer is selected from methyl acrylate or ethyl acrylate or mixtures thereof.

The mass average molecular mass of the (meth)acrylic polymer may be high, which means more than 50 000 g/mol, preferably more than 100 000 g/mol.

The mass average molecular mass may be measured by steric exclusion chromatography (SEC).

Regarding the (meth)acrylic monomer, the monomer is selected from acrylic acid, methacrylic acid, alkyl acrylic monomers, alkyl methacrylic monomers and mixtures thereof.

Preferably, the monomer is selected from acrylic acid, methacrylic acid, alkyl acrylic monomers, alkyl methacrylic monomers and their mixtures, the alkyl group containing 1 to 22 linear, branched or cyclic carbons; the alkyl group preferably contains 1 to 12 linear, branched or cyclic carbons.

Advantageously, the (meth)acrylic monomer is selected from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate and mixtures thereof.

More advantageously, the (meth)acrylic monomer is selected from methyl methacrylate, isobornyl acrylate or acrylic acid and mixtures thereof.

In a preferred embodiment, at least 50% by weight, preferably at least 60% by weight of the monomer is methyl methacrylate.

In a more preferred embodiment, at least 50% by weight, preferably at least 60% by weight, more preferably at least 70% by weight and advantageously at least 80% by weight and still more advantageously 90% by weight of the monomer is a mixture of methyl methacrylate with isobornyl acrylate and/or acrylic acid.

PMMA additives which may be mentioned are organic additives such as impact strength modifying agents generally known as "impact modifiers", or sequenced copolymers, thermal stabilizers, UV stabilizers, lubricants and mixtures thereof.

The impact modifier is in the form of fine particles comprising an elastomeric core and at least one thermoplastic envelope, the particle size generally being below 1 µm and advantageously in the range 50 to 300 µm. The impact modifier is prepared by emulsion polymerization. The quantity of impact modifier in the liquid (meth)acrylic syrup is 0 to 50% by weight, preferably 0 to 25% by weight and advantageously 0 to 20% by weight.

PMMA fillers which may be mentioned are carbon nanotubes or mineral fillers, including mineral nanofillers ($TiO_2$, silica).

The polyether block-containing and polyamide block-containing copolymers, abbreviated to "PEBA", result from polycondensation of polyamide blocks having reactive ends with polyether blocks having reactive ends such as, inter alia:

1) polyamide blocks having diamine chain ends with polyoxyalkylene blocks having dicarboxylic chain ends.

2) polyamide blocks having dicarboxylic chain ends with polyoxyalkylene blocks having diamine chain ends obtained, for example, by cyanoethylation and hydrogenation of aliphatic dihydroxylated alpha-omega polyoxyalkylene blocks known as polyetherdiols.

3) polyamide blocks having dicarboxylic chain ends with polyetherdiols, the products obtained in this particular case being polyetheresteramides.

The polyamide blocks having dicarboxylic chain ends originate, for example, from the condensation of polyamide precursors in the presence of a chain-limiting dicarboxylic acid. The polyamide blocks having diamine chain ends originate, for example, from the condensation of polyamide precursors in the presence of a chain-limiting diamine.

The number average molar mass Mn of the polyamide blocks is in the range 400 to 20000 g/mole, preferably in the range 500 to 10000 g/mole.

The polyamide block-containing and polyether block-containing polymers may also comprise motifs distributed in a random manner.

Advantageously, three types of polyamide blocks may be used:

In the first type, the polyamide blocks originate from the condensation of a dicarboxylic acid, in particular those containing 4 to 20 carbon atoms, preferably those containing 6 to 18 carbon atoms and an aliphatic or aromatic diamine, in particular those containing 2 to 20 carbon atoms, preferably those containing 6 to 14 carbon atoms.

Examples of dicarboxylic acids that may be cited are 1,4-cyclohexyldicarboxylic acid, butanedioic, adipic, azelaic, suberic, sebacic, dodecanedicarboxylic, octadecanedicarboxylic acids and terephthalic and isophthalic acids, but also dimerized fatty acids.

Examples of diamines that may be cited are tetramethylene diamine, hexamethylenediamine, 1,10-decamethylenediamine, dodecamethylenediamine, trimethylhexamethylene diamine, the isomers of bis-(4-aminocyclohexyl)-methane (BACM), bis-(3-methyl-4-aminocyclohexyl) methane (BMACM), and 2-2-bis-(3-methyl-4-aminocyclohexyl)-propane (BMACP), and para-amino-di-cyclo-hexyl-methane (PACM), and isophoronediamine (IPDA), 2,6-bis-(aminomethyl)-norbornane (BAMN) and piperazine (Pip).

Advantageously, blocks PA4.12, PA4.14, PA4.18, PA6.10, PA6.12, PA6.14, PA6.18, PA9.12, PA10.10, PA10.12, PA10.14 and PA10.18 are used.

In the second type, the polyamide blocks are the result of condensation of one or more alpha-omega aminocarboxylic acids and/or one or more lactams containing 6 to 12 carbon atoms in the presence of a dicarboxylic acid containing 4 to 12 carbon atoms or a diamine. Examples of lactams that may be cited are caprolactam, oenantholactam and lauryllactam. Examples of alpha-omega amino carboxylic acids that may be cited are aminocaproic, amino-7-heptanoic, amino-11-undecanoic and amino-12-dodecanoic acids.

Advantageously, the polyamide blocks of the second type are polyamide 11, polyamide 12 or polyamide 6.

In accordance with a third type, the polyamide blocks result from the condensation of at least one alpha-omega aminocarboxylic acid (or a lactam), at least one diamine and at least one dicarboxylic acid.

In this case, the PA polyamide blocks are prepared by polycondensation:
 of the linear or aromatic aliphatic diamine or diamines containing X carbon atoms;
 of the dicarboxylic acid or acids containing V carbon atoms; and
 the comonomer or co-monomers {Z}, selected from lactams and alpha-omega aminocarboxylic acids containing Z carbon atoms and equimolar mixtures of at least one diamine containing X1 carbon atoms and at least one dicarboxylic acid containing Y1 carbon atoms, (X1, V1) being different from (X, Y),
 said comonomer or co-monomers {Z} being introduced in a proportion by weight of up to 50%, preferably up to 20%, still more advantageously up to 10% with respect to the whole of the polyamide precursor monomers;
 in the presence of a chain limiter selected from dicarboxylic acids.

Advantageously, the chain limiter used is the dicarboxylic acid containing Y carbon atoms, which is introduced in excess with respect to the stoichiometry of the diamine or diamines.

In a variation of this third type, the polyamide blocks result from condensation of at least two alpha-omega aminocarboxylic acids or at least two lactams containing 6 to 12 carbon atoms or a lactam and an aminocarboxylic acid not containing the same number of carbon atoms in the optional presence of a chain limiter. Examples of an aliphatic alpha-omega aminocarboxylic acid that may be cited are aminocaproic, amino-7-heptanoic, amino-11-undecanoic and amino-12-dodecanoic acids. Examples of lactams that may be cited are caprolactam, oenantholactam and lauryllactam. Examples of aliphatic diamines that may be cited are hexamethylenediamine, dodecamethylenediamine and trimethylhexamethylene diamine. An example of a cycloaliphatic diacid that may be cited is 1,4-cyclohexyldicarboxylic acid. Examples of aliphatic diacids that may be cited are butanedioic, adipic, azelaic, suberic, sebacic, dodecanedicarboxylic acids, dimerized fatty acids (these dimerized fatty acids preferably have a dimer content of at least 98%; preferably, they are hydrogenated; they are commercially available under the trade mark "PRIPOL" from "UNICHEMA", or the trade name EMPOL from HENKEL) and α,ω polyoxyalkylene diacids. Examples of aromatic diacids that may be cited are terephthalic (T) and isophthalic (I) acid. Examples of cycloaliphatic diamines that may be cited are the isomers of bis-(4-aminocyclohexyl)-methane (BACM), bis-(3-methyl-4-aminocyclohexyl)methane (BMACM), and 2-2-bis-(3-methyl-4-aminocyclohexyl)-propane(BMACP), and para-amino-di-cyclo-hexyl-methane (PACM). Other diamines that are frequently used are isophoronediamine (IPDA), 2,6-bis-(aminomethyl)-norbornane (BAMN) and piperazine.

Examples of polyamide blocks of the third type that may be cited are as follows:
 6.6/6, in which 6.6 denotes hexamethylenediamine motifs condensed with adipic acid. 6 denotes motifs resulting from the condensation of caprolactam.
 6.6/6.10/11/12, in which 6.6 denotes hexamethylenediamine condensed with adipic acid. 6.10 denotes hexamethylenediamine condensed with sebacic acid. 11 denotes motifs resulting from the condensation of aminoundecanoic acid. 12 denotes motifs resulting from the condensation of lauryllactam.

Advantageously, said at least one polyamide block of the copolymer(s) used in the composition of the invention comprises at least one of the following polyamide monomers: 6, 11, 12, 5.4, 5.9, 5.10, 5.12, 5.13, 5.14, 5.16, 5.18, 5.36, 6.4, 6.9, 6.10, 6.12, 6.13, 6.14, 6.16, 6.18, 6.36, 10.4, 10.9, 10.10, 10.12, 10.13, 10.14, 10.16, 10.18, 10.36, 103, 12.4, 12.9, 12.10, 12.12, 12.13, 12.14, 12.16, 12.18, 12.36, 12.T and mixtures or copolymers thereof; and preferably selected from the following polyamide monomers: 6, 11, 12, 6.10, 10.10, 10.12, and their mixtures or copolymers.

Preferably, the PA blocks comprise at least 30%, preferably at least 50%, preferably at least 75%, preferably 100% by weight of PA 11 with respect to the total weight of the PA blocks.

The polyether blocks represent 50% to 80% by weight of the polyamide and polyether block-containing copolymer. The mass Mn of the polyether blocks is in the range 100 to 6000 g/mole and preferably in the range 200 to 3000 g/mole.

The polyether blocks are constituted by alkylene oxide motifs. These motifs may usually be ethylene oxide motifs, propylene oxide motifs or tetrahydrofuran (which produces polytetramethylene glycol concatenations). In the present composition of the invention, PEG blocks (polyethylene glycol) are used, i.e. those constituted by ethylene oxide motifs, optionally combined with PPG (propylene glycol) blocks, i.e. those consisting of propylene oxide motifs, PO3G (polytrimethylene glycol) blocks, i.e. those consisting of polytrimethylene ether glycol blocks, and/or PTMG blocks, i.e. those consisting of tetramethylene glycol blocks, also known as polytetrahydrofuran. The PEBA copolymers may comprise several types of polyether in their chain, the co-polyethers possibly being block or random copolymers.

Advantageously, the copolymer of the composition also comprises at least one polyether other than PEG, selected from PTMG, PPG, PO3G and mixtures thereof.

The PEBA used in the composition of the invention comprises more than 50%, preferably more than 55%, or even more than 60% by weight of PEG polyether blocks with respect to the total weight of the PEBA.

It is also possible to use blocks obtained by oxyethylation of bisphenols, such as bisphenol A, for example. These latter products have been described in patent EP613919.

The polyether blocks may also consist of primary ethoxylated amines. Examples of primary ethoxylated amines that may be cited are products with formula:

in which m and n are in the range 1 to 20 and x is in the range 8 to 18. These products are commercially available under the trade mark NORAMOX® from CECA and under the trade mark GENAMIN® from CLARIANT.

The flexible polyether blocks may comprise polyoxyalkylene blocks with $NH_2$ chain ends, blocks of this type possibly being obtained by cyanoacetylation of aliphatic dihydroxylated alpha-omega polyoxyalkylene blocks termed polyetherdiols. More particularly, it is possible to use Jeffamines (for example Jeffamine® D400, D2000, ED 2003, XTJ 542, commercially available products from Huntsman, also described in patent documents JP2004346274, JP2004352794 and EP1482011).

The polyetherdiol blocks are either used as they are and co-polycondensed with polyamide blocks with carboxylic ends, or they are aminated in order to be transformed into polyether diamines and condensed with polyamide blocks having carboxylic ends. The general two-step method for the preparation of PEBA copolymers with ester bonds between the PA blocks and the PE blocks is known and has been described, for example, in French patent FR2846332. The general method for the preparation of the PEBA copolymers of the invention having amide bonds between the PA blocks and the PE blocks is known and has been described, for example, in European patent EP1482011. The polyether blocks may also be mixed with polyamide precursors and a diacid chain limiter in order to make the polyamide block-containing and polyether block-containing polymers having motifs distributed in a random manner (one-step process).

Clearly, the designation PEBA in the present description of the invention refers to PEBAX® sold by Arkema, to Vestamid® sold by Evonik®, to Grilamid® sold by EMS, as well as to Pelestat® type PEBA sold by Sanyo, or to any other PEBA from other suppliers.

Advantageously, the PEBA copolymers have PA blocks that are PA 6, PA 11, PA 12, PA 6.12, PA 6.6/6, PA 10.10 and/or PA 6.14, preferably PA 11 and/or PA 12 blocks; and PE blocks that are PEG.

Preferably, the copolymer of the invention comprises at least one PEBA selected from: PA6-PEG, PA11-PEG, PA12-PEG, PA10.10-PEG, PA10.12-PEG, PA6/12-PEG and mixtures thereof; and preferably comprises, or better still is, PA11-PEG.

While the block copolymers described above generally comprise at least one polyamide block and at least one polyether block, it is clear that in fact, the present invention encompasses all alloys of a copolymer comprising two, three, four (or more) different blocks selected from those described in the present description, as long as at least one of these blocks is a polyamide block and that the copolymer comprises more than 50% of PEG.

Advantageously, the copolymer alloy of the invention comprises a segmented block copolymer comprising three different types of blocks (denoted "triblock" in the present description of the invention), which result from the condensation of several of the blocks described above. Said triblock is preferably selected from copolyetheresteramides, copolyetheramideurethanes, in which:
the percentage by weight of polyamide blocks is more than 10%;
the percentage by weight of PEG blocks is more than 50%;
with respect to the total mass of the triblock.

Thus, in accordance with one particular embodiment of the composition of the invention, said copolymer comprising PA blocks and PE blocks is a segmented block copolymer comprising three different types of blocks, said copolymer being selected from copolyetheresteramides and copolyetheramideurethanes.

Advantageously, the copolymer has an inherent viscosity of 2 or less; preferably 1.5 or less; preferably 1.4 or less; preferably 1.3 or less; preferably 1.2 or less. It has been shown that the transparency of the composition is improved (increased transmittance) at lower copolymer viscosities. In the present description, the inherent viscosity is measured at a polymer concentration of 0.5% by weight in solution in metacresol with respect to the total weight of the solution, at 20° C., using an Ubbelohde viscosimeter.

Advantageously, because of its permanent antistatic properties and surface resistivity of less than $10^{12}$ ohm/square, the composition of the invention does not require and therefore does not contain an organic salt.

Nevertheless, it is possible to incorporate an organic salt or an ionic liquid into the composition of the invention, in order to further improve its antistatic performance.

Advantageously, the composition of the invention further comprises 0.1% to 10%, preferably 0.1% to 5% by weight of at least one organic salt in the molten state with respect to the total composition weight.

The organic salts are salts that are consisting of organic cations associated with inorganic or organic anions.

Said at least one organic salt is added in the molten state, i.e. when the organic salt is at a temperature above its fusion temperature. Preferably, said at least one organic salt has a fusion temperature of less than 300° C., preferably less than 200° C., preferably less than 100° C., and thus advantageously constitutes an ionic liquid, preferably below 30° C. The principal properties of ionic liquids are in particular that they are non-volatile (no diffusion into the atmosphere of volatile organic compounds), non-flammable (and thus easy to handle and store), stable at high temperatures (certainly up to 400° C.), are very good conductors, and highly stable as regards water and oxygen.

Advantageously, said at least one organic salt comprises at least one cation comprising at least one of the following molecules: ammonium, sulfonium, pyridinium, pyrrolidinium, imidazolium, imidazolinium, phosphonium, lithium, guanidinium, piperidinium, thiazolium, triazolium, oxazolium, pyrazolium, and mixtures thereof.

Advantageously, said at least one organic salt comprises at least one anion comprising at least one of the following molecules: imides, especially bis(trifluoromethanesulfonyl) imide (abbreviated to NTf2-); borates, especially tetrafluoroborate (abbreviated to BF4-); phosphates, especially hexafluorophosphate (abbreviated to PF6-); phosphinates and phosphonates, especially alkyl-phosphonates; amides, especially dicyanamide (abbreviated to DCA-); aluminates, especially tetrachloroaluminate (AlCl4-), halides (such as bromide, chloride, iodide anions, etc), cyanates, acetates ($CH_3COO$—), especially trifluoroacetate; sulfonates, especially methanesulfonate ($CH_3SO_3$—), trifluoromethanesulfonate; sulfates, especially ethyl sulfate, hydrogen sulfate, and mixtures thereof.

The term "organic salt" as used in the context of the invention more particularly means any organic salt that is stable at the temperatures used during synthesis of the block copolymer in accordance with the process of the invention. The skilled person will be able to refer to data sheets for organic salts, which indicate the limiting decomposition temperature for each organic salt.

Examples of organic salts that may be used in the synthesis process of the invention that may in particular be cited are organic salts based on the ammonium cation, based on the imidazolium or imidazolinium cation, based on the pyridinium cation, based on the dihydropyridinium cation, based on the tetrahydropyridinium cation, based on the pyrrolidinium cation, based on the guanidine cation, based on the phosphonium cation.

Organic salts based on the ammonium cation associate, for example:
- a N-trimethyl-N-propylammonium cation with a bis(trifluoromethanesulfonyl)imide anion;
- a N-trimethyl-N-butylammonium or N-trimethyl-N-hexylammonium cation with an anion selected from bromide, tetrafluoroborate, hexafluorophosphate, bis(trifluoromethanesulfonyl)imide;
- a N-tributyl-N-methylammonium cation with an iodide, bis(trifluoromethanesulfonyl)imide or dicyanamide anion;
- a tetraethylammonium cation with a tetrafluoroborate anion;
- a (2-hydroxyethyl)trimethylammonium cation with a dimethylphosphate anion;
- a di(2-hydroxyethyl)ammonium cation with a trifluoracetate anion;
- a N,N-di(2-methoxy)ethylammonium cation with a sulfamate anion;
- a N,N-dimethyl(2-hydroxyethyl)ammonium cation with a 2-hydroxyacetate or trifluoroacetate anion;
- a N-ethyl-N,N-dimethyl-2-methoxyethyl ammonium cation with a bis(trifluoromethylsulfonyl)imide anion;
- an ethyldimethyipropylammonium cation and a bis(trifluoromethylsulfonyl)imide anion;
- a methyltrioctylammonium cation and a bis(trifluormethylsulfonyl)imide anion;
- a methyltrioctylammonium cation and a trifluoroacetate or trifluoromethylsulfonate anion;
- a tetrabutylammonium cation and a bis(trifluoromethyl sulfonyl)imide anion;
- a tetramethylammonium cation and a bis(oxalato(2-))-borate or tris(pentafluoroethyl)trifluorophosphate anion.

It is also possible to cite organic salts based on imidazole, such as disubstituted imidazoles, monosubstituted imidazoles, trisubstituted imidazoles; in particular those based on the imidazolium cation or the imidazolinium cation.

Examples of organic salts based on imidazolium cations that may be cited include, for example:
- a H-methylimidazolium cation with a chloride anion;
- a 1-ethyl-3-methylimidazolium cation with a chloride, bromide, tetrafluoroborate, hexafluorophosphate, trifluoromethanesulfonate, bis(trifluoromethanesulfonyl) imide, tetrachloroaluminate, ethyl-phosphonate or methyl-phosphonate, methanesulfonate, ethyl-sulfate, ethyl-sulfonate anion;
- a 1-butyl-3-methylimidazolium cation with a chloride, bromide, tetrafluoroborate, hexafluorophosphate, trifluoromethanesulfonate, bis(trifluoromethanesulfonyl) imide, tetrachloroaluminate, acetate, hydrogen sulfate, trifluoroacetate, methanesulfonate anion;
- a 1,3-dimethylimidazolium cation with a methyl-phosphonate anion;
- a 1-propyl-2,3-dirnethylimidazolium cation with a bis(trifluoromethanesulfonyl)imide anion;
- a 1-butyl-2,3-dimethylimidazolium cation with a tetrafluoroborate bis(trifluoromethanesulfonyl)imide anion;
- a 1-hexyl-3-methylimidazolium cation with a tetrafluoroborate, hexafluorophosphate, bis(trifluoromethanesulfonyl)imide anion;
- a 1-octyl-3-methylimidazolium cation with a bis(trifluoromethanesulfonyl)imide anion;
- a 1-ethanol-3-methylimidazolium cation with a chloride, bromide, tetrafluoroborate, hexafluorophosphate, bis(trifluoromethanesulfonyl)imide, dicyanamide anion.

Examples of organic salts based on the pyridinium cation that may also be cited are: N-butyl-3-methylpyridinium bromide, N-butyl-methyl-4-pyridinium chloride, N-butyl-methyl-4-pyridinium tetrafluoroborate, N-butyl-3-methylpyridinium chloride, N-butyl-3-methylpyridinium dicyanamide, N-butyl-3-methylpyridinium methylsulfate, 1-butyl-3-methylpyridinium tetrafluoroborate, N-butylpyridinium chloride, N-butylpyridinium tetrafluoroborate, N-butylpyridinium trifluoromethylsulfonate, 1-ethyl-3-hydroxymethylpyridinium ethylsulfate, N-hexylpyridinium bis(trifluoromethylsulfonyl)imide, N-hexylpyridinium trifluoromethanesulfonate, N-(3-hydroxypropyl)pyridinium bis(trifluoromethylsulfonyl)imide, N-butyl-3-methylpyridinium trifluoromethanesulfonate, N-butyl-3-methylpyridinium hexafluorophosphate.

Examples of organic salts based on a pyrrolidinium cation that may also be cited are: butyl-1-methyl-1-pyrrolidinium chloride, butyl-1-methyl-pyrrolidinium dicyanamide, butyl-1-methyl-1-pyrrolidinium trifluoromethanesulfonate, butyl-1-methyl-1-pyrrolidinium tris(pentafluoroethyl), 1-butyl-1-methylpyrrolidinium bis[oxalato(2-)]borate, 1-butyl-1-methylpyrrolidinium bis(trifluoromethylsulfonyl)imide, 1-butyl-1-methylpyrrolidinium dicyanamide, 1-butyl-1-methylpyrrolidinium trifluoroacetate, 1-butyl-1-methylpyrrolidinium trifluoromethanesulfonate, butyl-1-methyl-1-pyrrolidinium tris(pentafluoroethyl)trifluorophosphate, 1,1-dimethylpyrrolidinium iodide, 1-(2-ethoxyethyl)-1-methylpyrrolidinium bis(trifluoromethylsulfonyl)imide, 1-hexyl-1-methylpyrrolidinium bis(trifluoromethylsulfonyl)

imide, 1-(2-methoxyethyl)-1-methyl pyrrolidinium bis(trifluoromethylsulfonyl)imide, methyl-1-octyl-1-pyrrolidinium chloride, 1-butyl-1-methylpyrrolidinium bromide.

It is also possible to cite organic salts associating:
- a 1-ethyl-1-methylpyrrolidinium cation with a bromide, tetrafluoroborate, hexafluorophosphate, trifluoromethanesulfonate anion;
- a 1-butyl-1-methylpyrrolidinium cation with a chloride, bromide, tetrafluoroborate, hexafluorophosphate, trifluoromethanesulfonate, bis(trifluoromethanesulfonyl)imide, dicyanamide, acetate or hydrogen sulfate anion;
- a N-propyl-N-methylpyrrolidinium cation with a bis(trifluoromethanesulfonyl)imide anion;
- a 1-methyl-1-propylpiperidinium cation with a bis(trifluoromethanesulfonyl)imide anion;

Further examples of organic salts based on a guanidine cation that may be cited are: guanidine trifluoromethylsulfonate, guanidine tris(pentafluoroethyl)trifluoro phosphate, hexamethylguanidine tris(pentafluoroethyl)trifluorophosphate.

It is also possible to cite organic salts based on a phosphonium cation such as: trihexyl(tetradecyl)phosphonium bis[oxalat(2-)]borate; trihexyl(tetradecyl)phosphonium bis(trifluoromethylsulfonyl) imide; trihexyl(tetradecyl)phosphonium tris(pentafluoroethyl)trifluorophosphate.

The list of organic salts and cations and anions cited above that may be included in the composition of organic salts that may be used in the invention is given solely by way of example; it is neither exhaustive nor limiting. As a consequence, the addition of any other organic salt may of course be envisaged in the process of the invention, as long as the decomposition temperature of the organic salt is higher than the temperatures of the steps of the process of the invention during which the organic salt is present.

Advantageously, the composition of the invention further comprises at least one inorganic salt, i.e. an alkali metal salt or alkaline-earth metal salt; those that may in particular be cited include alkali metal salts such as lithium, sodium, potassium, etc.; and those of alkaline-earths such as magnesium, calcium, etc; with organic acids (mono- or di-carboxylic containing 1 to 12 carbon atoms, for example formic acid, acetic acid, propionic acid, oxalic acid, succinic acid, etc; sulfonic acids containing 1 to 20 carbons, for example methanesulfonic acid, p-toluenesulfonic acid, thiocyanic acid, etc.), or mineral acids (halohydric acids, for example hydrochloric acid, hydrobromic acid, perchloric acid, sulfuric acid, phosphoric acid, etc). The following may be cited: potassium acetate, lithium acetate; lithium chloride, magnesium chloride, calcium chloride, sodium chloride, sodium bromide, potassium bromide, magnesium bromide, lithium bromide, lithium perchlorate, sodium perchlorate or potassium perchlorate, potassium sulfate, potassium phosphate, thiocyanate, and the like.

Of these, halides are preferred, preferably lithium chloride, sodium chloride, potassium chloride, potassium acetates and potassium perchlorates. The quantity of inorganic salt is generally in the range 0.001% to 3%, preferably 0.01% to 2%, with respect to the weight of the composition.

The composition of the invention may also be supplemented with stabilizers, plasticizers, lubricants, natural or organic fillers, colorants, pigments, nacres, antimicrobial agents, flame retardants, antistatic agents, agents modifying the viscosity of the copolymer and/or any other additive or adjuvant already cited and well known to the skilled person in the field of thermoplastic polymers.

Advantageously, said PMMA, said PA blocks and/or said PE blocks of the composition of the invention are obtained at least in part from renewable starting materials.

Advantageously, the composition of the invention comprises a quantity of biocarbon of at least 1%, which corresponds to a $^{14}C/^{12}C$ isotopic ratio of at least $1.2\times10^{-14}$. Preferably, said composition comprises a quantity of biocarbon of more than 5%, preferably more than 10%, preferably more than 25%, preferably more than 50%, preferably more than 75%, preferably more than 90%, preferably more than 95%, preferably more than 98%, preferably more than 99%, advantageously substantially equal to 100%.

In accordance with a particularly advantageous embodiment of the present invention, the polyamide blocks and/or the polyether blocks and/or the PMMA are obtained in their entirety from renewable materials.

A material of renewable origin, also known as a biomaterial, is an organic material in which the carbon originates from $CO_2$ recently fixed (on a human scale) by photosynthesis from the atmosphere. On land, this $CO_2$ is captured or fixed by plants. At sea, the $CO_2$ is captured or fixed by bacteria or plankton, proceeding to photosynthesis. A biomaterial (100% natural carbon origin) has a $^{14}C/^{12}C$ isotopic ratio of more than $10^{-12}$, typically of the order of $1.2\times10^{-12}$, while a fossil material has a zero ratio, In fact, the $^{14}C$ isotope is formed in the atmosphere and is then integrated by photosynthesis on a time scale of at most a few tens of years. The half-life of $^{14}C$ is 5730 years. Thus, the materials obtained from photosynthesis, namely and generally plants, necessarily contain a maximum amount of $^{14}C$ isotope.

The biomaterial or biocarbon content is determined by application of the standards ASTM D 6866 (ASTM D 6866-06) and ASTM D 7026 (ASTM D 7026-04). The standard ASTM D 6866 pertains to "Determining the Biobased Content of Natural Range Materials Using Radiocarbon and Isotope Ratio Mass Spectrometry Analysis", while the standard ASTM D 7026 pertains to "Sampling and Reporting of Results for Determination of Biobased Content of Materials via Carbon Isotope Analysis". The second standard refers to the first in its first paragraph.

The first standard describes a test for measuring the $^{14}C/^{12}C$ ratio of a sample and compares it with the $^{14}C/^{12}C$ of a reference sample of 100% renewable origin, to produce a relative percentage of C of renewable origin in the sample. The standard is based on the same concepts as $^{14}C$ carbon dating, but without applying the dating equations.

The ratio that is then calculated is denoted "pMC" (percent Modern Carbon). If the material to be analyzed is a mixture of biomaterial and fossil material (no radioactive isotope), then the value of pMC obtained is directly correlated with the quantity of biomaterial present in the sample. The reference value used for the $^{14}C$ dating is a value dating from the 1950s. That year was chosen because of the existence of nuclear tests in the atmosphere which had introduced large quantities of isotopes into the atmosphere after this date. The reference 1950 corresponds to a pMC value of 100. Because of the thermonuclear tests, the actual value to use is approximately 107.5 (which corresponds to a correction factor of 0.93). The radioactive carbon signature of a modern plant is thus 107.5. A signature of 54 pMC and 99 pMC thus correspond to a quantity of biomaterial in the sample of 50% and 93% respectively.

The standard ASTM D 6866 proposes three techniques for measuring the quantity of the $^{14}C$ isotope:
  LSC (Liquid Scintillation Counting) spectrometry using liquid scintillation. This technique consists of counting "beta" particles obtained from the disintegration of $^{14}C$.

The beta radiation obtained from a sample with a known mass (known number of C atoms) is measured over a certain time. This "radioactivity" is proportional to the number of atoms of $^{14}C$ which can thus be determined. The $^{14}C$ present in the sample emits 13 radiation which, in contact with scintillating liquid (scintillator), gives rise to photons. These photons have different energies (in the range 0 to 156 keV) and form what is known as a $^{14}C$ spectrum. In two variations of this method, the analysis is based either on $CO_2$ which has previously been produced by the carbon-containing sample in an appropriate absorbing solution, or on benzene after prior conversion of the carbon-containing sample into benzene. Thus, the standard ASTM D 6866 provides two methods A and C, based on this LSC method.

AMS/IRMS (Accelerated Mass Spectrometry coupled with Isotope Radio Mass Spectrometry). This technique is based on mass spectrometry. The sample is reduced to graphite or gaseous $CO_2$, and analyzed in a mass spectrometer. This technique uses an accelerator and a mass spectrometer to separate the $^{14}C$ from the $^{12}C$ ions and thus determine the ratio of the two isotopes.

The compositions in accordance with the invention originate at least in part from biomaterial and thus have a biomaterial content of at least 1%, which corresponds to a $^{14}C$ content of at least $1.2\times10^{-14}$. This content is advantageously higher, in particular up to 100%, which corresponds to a $^{14}C$ content of $1.2\times10^{-12}$. Thus, the alloys of the invention may comprise 100% of biocarbon or, in contrast, may result from a mixture with a fossil origin.

Advantageously, the composition in accordance with the invention further comprises at least one agent improving the surface conductivity selected from: hygroscopic agents; fatty acids; lubricants; metals; metallic films; metallic powders; metallic nanopowders; aluminosilicates; amines such as quaternary amines; esters; fibers; carbon black; carbon fibers; carbon nanotubes; polyethylene glycol; intrinsically conductive polymers such as polyaniline, polythiophene, polypyrrole derivatives; masterbatches; and mixtures thereof.

Advantageously, the composition of the invention further comprises at least one additive and/or adjuvant selected from organic or inorganic fillers, reinforcing agents, plasticizers, stabilizers, antioxidants, UV screens, flame retardants, carbon black, carbon nanotubes; mineral or organic colorants, pigments, colorants, unmoulding agents, lubricants, foaming agents, shock resistant agents, shrink resistant agents, flame retardants, nucleating agents, and mixtures thereof.

The present invention also pertains to the use of a composition in accordance with the invention for the manufacture of at least a portion of the following items: an industrial part, an automobile part, a safety accessory, sign, luminous strip, signalling and advertising panel, display, etching, furniture, shop fitting, decoration, contact ball, dental prosthesis, ophthalmological implant, membrane for hemodialysis, optic fibers, artwork, decoration, sculpture, lenses, in particular camera lenses, disposable camera lenses, printing support, in particular a support for direct printing with UV inks for pictures, photographs, window glass, panoramic roof, vehicle headlights, etc.

The transparent compositions based on PMMA of the invention have definitively improved antistatic properties due to the reduction in surface resistivity provided by incorporating at least one block copolymer in accordance with the invention into at least a portion of a PMMA matrix as defined above. Adding said at least one copolymer to said matrix may be carried out using any of the processes known to the skilled person in the field of polymers, in particular by dry mixing, or by mixing at a temperature which is higher than the glass transition temperature of the various added polymers, or by shearing at a temperature substantially equal to the fluidization temperature of the various added polymers, in particular by rolling, extrusion, or by mixing in solution.

EXAMPLES

The examples below illustrate the present invention without limiting its scope. In the examples, all of the percentages are percentages by weight unless indicated otherwise.
Products Used in the Examples:
PEBA, not in accordance with the invention:
PEBA 1: PA12-PEG with PA12 blocks with a number average molar mass of 1500 g/mol and PEG blocks with a number average molar mass of 1500 g/mol, and inherent viscosity: 1.4.

PEBA 1b, "b" for "low viscosity": PA12-PEG with PA12 blocks with a number average molar mass of 1500 g/mol and PEG blocks with a number average molar mass of 1500 g/mol, and inherent viscosity: 1.1.

PEBA in accordance with the invention:
PEBA 2: PA11-PEG with PA11 blocks with a number average molar mass of 1000 g/mol and PEG blocks with a number average molar mass of 1500 g/mol, and inherent viscosity: 1.4.

PEBA 2b, "b" for "low viscosity": PA11-PEG with PA11 blocks with a number average molar mass of 1000 g/mol and PEG blocks with a number average molar mass of 1500 g/mol, and inherent viscosity: 1.2.
PMMA:
PMMA1 characterized by an MFI=2 g/10 min (230° C., 3.8 kg) and a Charpy (notched) impact strength at +23° C. of 2 kJ/m$^2$.

PMMA2 characterized by an MFI=14.5 g/10 min (230° C., 3.8 kg) and a Charpy (notched) impact strength at +23° C. of 2 kJ/m$^2$.

PMMA3 containing an acrylic impact modifier, characterized by an MFI=0.8 g/10 min (230° C., 3.8 kg) and a Charpy (notched) impact strength at +23° C. of kJ/m$^2$.

TABLE 1

| | Sample | Quantity of Pebax | Transmittance (ASTM D1003) (%) | Haze (ASTM D1003) (%) |
|---|---|---|---|---|
| 100% PEBA | PEBA 1 | 100% | 81 | 61 |
| | PEBA 2 | 100% | 75 | 74 |
| | PEBA 2b | 100% | 81.7 | 46 |
| PMMA/ | PMMA3 100% | 0% | 93 | 0.4 |
| PEBA | PMMA3/PEBA 2 (93/7) | 7% | 91.6 | 2 |
| compo- | PMMA3/PEBA 2 (90/10) | 10% | 91.1 | 2.1 |
| sitions | PMMA3/PEBA 2 (88/12) | 12% | 90.4 | 2.2 |
| (weight | PMMA3/PEBA 2 (85/15) | 15% | 89.5 | 2.7 |
| ratio) | PMMA3/PEBA 2 (80/20) | 20% | 89.2 | 3.1 |
| | PMMA3/PEBA 2b (93/7) | 7% | 91.8 | 2.2 |
| | PMMA3/PEBA 2b (90/10) | 10% | 91.8 | 2.2 |
| | PMMA3/PEBA 2b (88/12) | 12% | 91.2 | 3 |
| | PMMA3/PEBA 2b (85/15) | 15% | 91 | 3.77 |
| | PMMA3/PEBA 2b (80/20) | 20% | 90.1 | 5.12 |
| | PMMA1/PEBA 2 (80/20) | 20% | 88.4 | 2.92 |
| | PMMA1/PEBA 2b (80/20) | 20% | 90 | 5.5 |

TABLE 1-continued

| Sample | Quantity of Pebax | Transmittance (ASTM D1003) (%) | Haze (ASTM D1003) (%) |
|---|---|---|---|
| PMMA1/PEBA 1 (80/20) | 20% | 86.4 | 15.3 |
| PMMA1/PEBA 1b (80/20) | 20% | 86.2 | 25.2 |
| PMMA2/PEBA2 (80/20) | 20% | 89.3 | 4.06 |
| PMMA2/PEBA 2b (80/20) | 20% | 90.9 | 5.48 |
| PMMA2/PEBA 1 (80/20) | 20% | 87.9 | 19.6 |
| PMMA2/PEBA 1b (80/20 | 20% | 87.4 | 25.3 |

Figure 1:
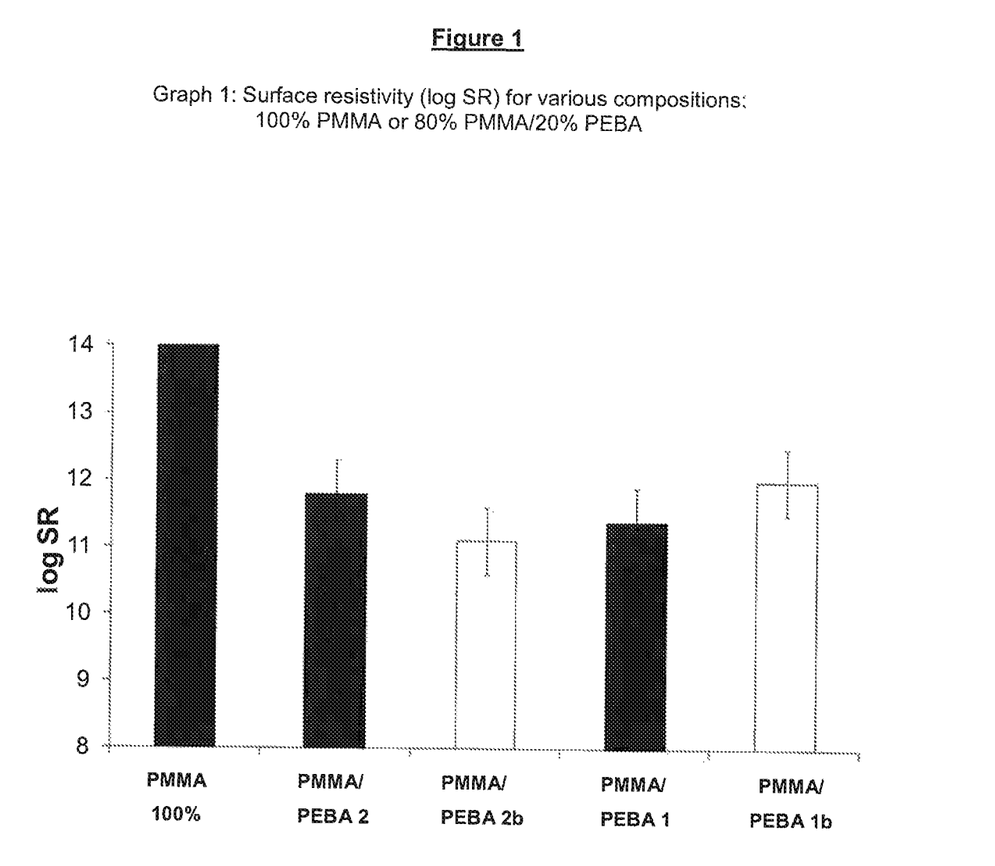
FIG. 1 represents the log of the surface resistivity for different compositions: 100% PMMA1 or 80% PMMA1/20% PEBA.

FIG. 1 (or graph 1) represents the log of the surface resistivity for different compositions: 100% PMMA1 or 80% PMMA1/20% PEBA.

The surface resistivity of the PMMA matrix was reduced by at least two powers of ten by incorporating 20% by weight of block copolymer (PEBA) with respect to the total composition weight.

Figure 2:
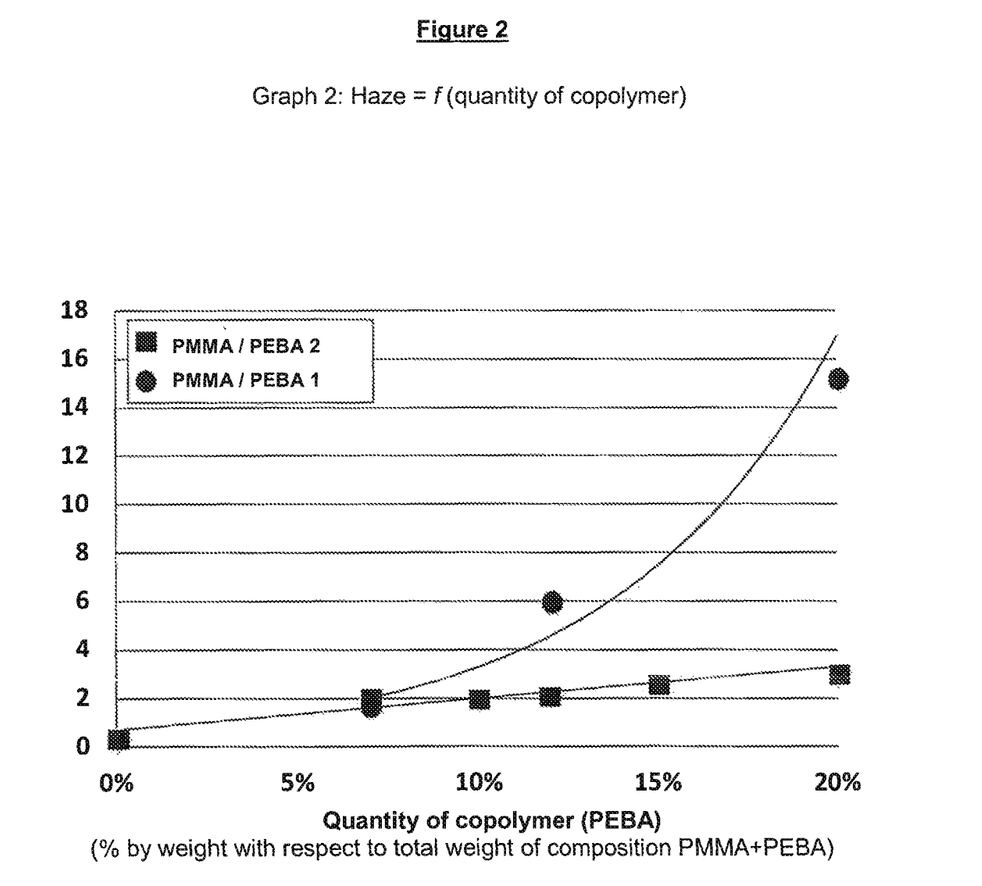
FIG. 2 represents the haze (%) as a function of the PEBA content (for PEBA 1 and for PEBA 2) in a composition based on PMMA1.

FIG. 2 (or graph 2) represents the haze (%) as a function of the PEBA content (for PEBA 1 and for PEBA 2) in a composition based on PMMA1.

The haze remained less than 4% in the case of compositions of PMMA in accordance with the invention (comprising PEBA2), in contrast to compositions not in accordance with the invention comprising PEBA1.

Embodiments

1. A transparent antistatic composition based on polymethyl methacrylate (PMMA), comprising:
   55% to 99.9% by weight of PMMA, and
   0.1% to 45% by weight of at least one polyamide (PA) block-containing and polyether (PE) block-containing copolymer (PEBA) comprising polyethylene glycol (PEG), with respect to the total composition weight,
said copolymer being characterized in that it comprises in the range between 50% to 80% by weight of PEG with respect to the total weight of copolymer.

2. The composition of embodiment 1, comprising:
   65% to 97%, preferably 70% to 95%, preferably 80% to 93%, preferably 80% to 88%, preferably 85% to 88% by weight of PMMA, and
   3% to 35%, preferably 5% to 30%, preferably 7% to 20%, preferably 12% to 20%, preferably 12% to 15% by weight of copolymer comprising PEG,
with respect to the total composition weight.

3. The composition of embodiment 1 or embodiment 2, in which said copolymer comprises 55% to 75%, preferably 60% to 70% by weight of PEG with respect to the total weight of copolymer.

4. The composition of any one of the preceding embodiments, in which said at least one polyamide block comprises at least one of the following polyamide monomers: 6, 11, 12, 5.4, 5.9, 5.10, 5.12, 5.13, 5.14, 5.16, 5.18, 5.36, 6.4, 6.9, 6.10, 6.12, 6.13, 6.14, 6.16, 6.18, 6.36, 10.4, 10.9, 10.10, 10.12, 10.13, 10.14, 10.16, 10.18, 10.36, 10.T, 12.4, 12.9, 12.10, 12.12, 12.13, 12.14, 12.16, 12.18, 12.36, 12.T and mixtures thereof or copolymers; and preferably selected from the following polyamide monomers: 6, 11, 12, 6.10, 10.10, 10.12, and their mixtures or copolymers, 5. The composition of any one of the preceding embodiments, in which the PA blocks comprise at least 30%, preferably at least 50%, preferably at least 75%, preferably 100% by weight of PA 11 with respect to the total weight of PA blocks.

6. The composition of any one of the preceding embodiments, in which said copolymer further comprises at least one polyether other than PEG selected from PTMG, PPG, PO3G, and mixtures thereof.

7. The composition of any one of the preceding embodiments, in which said copolymer comprises at least one PEBA selected from: PA6-PEG, PA11-PEG, PA12-PEG, PA10.10-PEG, PA10.12-PEG and mixtures thereof; and preferably comprises PA11-PEG.

8. The composition of any one of the preceding embodiments, in which said copolymer comprising PA blocks and PE blocks is a segmented block copolymer comprising three different types of blocks, said copolymer being selected from copolyetheresteramides and copolyetheramideurethanes.

9. The composition of any one of the preceding embodiments, in which said copolymer has an inherent viscosity of 2 or less; preferably 1.5 or less; preferably 1.4 or less; preferably 1.3 or less; preferably 1.2 or less.

10. The composition of any one of the preceding embodiments, in which said PMMA, said PA blocks and/or said PE blocks are obtained at least in part from renewable starting materials.

11. The composition of embodiment 10, comprising a quantity of biocarbon of at least 1%, which corresponds to a 14C/12C isotopic ratio of at least $1.2 \times 10^{-14}$.

12. The composition of embodiment 11, comprising a quantity of biocarbon of more than 5%, preferably more than 10%, preferably more than 25%, preferably more than 50%, preferably more than 75%, preferably more than 90%, preferably more than 95%, preferably more than 98%, preferably more than 99%, advantageously substantially equal to 100%.

13. The composition of any one of the preceding embodiments, comprising no organic salt.

14. The composition of any one of the preceding embodiments, further comprising 0.1% to 10%, preferably 0.1% to 5% by weight of at least one organic salt in the molten state with respect to the total composition weight.

15. The composition of embodiment 6, in which said at least one organic salt comprises at least one cation comprising at least one of the following molecules: ammonium, sulfonium, pyridinium, pyrrolidinium, imidazolium, imidazolinium, phosphonium, lithium, guanidinium, piperidinium, thiazolium, triazolium, oxazolium, pyrazolium, and mixtures thereof.

16. The composition of any one of embodiments 6 or 7, in which said at least one organic salt comprises at least one anion comprising at least one of the following molecules: imides, especially bis(trifluoromethanesulfonyl)imide; borates, especially tetrafluoroborate; phosphates, especially hexafluorophosphate; phosphinates and phosphonates, especially alkyl-phosphonates; amides, especially dicyanamide; aluminates, especially tetrachloroaluminate, halides such as bromide, chloride, iodide anions; cyanates; acetates, especially trifluoroacetate; sulfonates, especially methanesulfonate, trifluoromethanesulfonate; sulfates, especially ethyl sulfate, hydrogen sulfate, and mixtures thereof.

17. The composition of any one of the preceding embodiments, further comprising at least one agent improving the surface conductivity selected from: hygroscopic agents; fatty acids; lubricants; metals; metallic films; metallic powders; metallic nanopowders; aluminosilicates; amines such as quaternary amines; esters; fibers; carbon black; carbon fibers; carbon nanotubes; polyethylene glycol; intrinsically conductive polymers such as polyaniline, polythiophene, polypyrrole derivatives; masterbatches; and mixtures thereof.

18. The composition of any one of the preceding embodiments, further comprising at least one additive and/or adjuvant selected from organic or inorganic fillers, reinforcing agents, plasticizers, stabilizers, antioxidants, UV screens, flame retardants, carbon black, carbon nanotubes; mineral or organic colorants, pigments, colorants, unmoulding agents, lubricants, foaming agents, shock resistant agents, shrink resistant agents, flame retardants, nucleating agents, and mixtures thereof.

19. Use of a composition of any one of embodiments 1 to 18, for the manufacture of at least a portion of the following items: an industrial part, an automobile part, a safety accessory, sign, luminous strip, signalling and advertizing panel, display, etching, furniture, shop fitting, decoration, contact ball, dental prosthesis, ophthalmological implant, membrane for hemodialysis, optic fibers, artwork, sculpture, camera lenses, disposable camera lenses, printing support, in particular a support for direct printing with UV inks for pictures, photographs, window glass, panoramic roof.

The invention claimed is:

1. A transparent antistatic composition based on a polymethyl methacrylate (PMMA) polymer, comprising:
   65% to 93% by weight of the PMMA polymer, wherein the PMMA polymer is modified with a PMMA organic additive selected from the group consisting of lubricants, UV stabilizers, thermal stabilizers or mixtures thereof; and
   7% to 35% by weight of at least one polyamide (PA) block-containing and polyether (PE) block-containing copolymer (PEBA) comprising polyethylene glycol (PEG),
   with respect to the total composition weight,
   wherein said copolymer comprises about 60% by weight of PEG with respect to the total weight of copolymer; and
   wherein the composition does not contain an organic salt,
   in which said copolymer is selected from: PA6-PEG, PA11-PEG, PA12-PEG, PA10.10-PEG, PA10.12-PEG and mixtures thereof,
   wherein the composition has a haze value less than 10%.

2. The composition of claim 1, in which the PA blocks comprise at least 30% by weight of PA 11 with respect to the total weight of PA blocks.

3. The composition of claim 1, in which said copolymer further comprises at least one polyether other than PEG selected from polytetramethylene glycol (PTMG), polypropylene glycol (PPG), polytrimethylene glycol (PO3G), and mixtures thereof.

4. The composition of claim 1, in which said copolymer comprising PA blocks and PE blocks is a segmented block copolymer comprising three different types of blocks, said copolymer being selected from copolyetheresteramides and copolyetheramideurethanes.

5. The composition of claim 1, in which said copolymer has an inherent viscosity of 2 or less.

6. The composition of claim 1, in which said PMMA, said PA blocks and/or said PE blocks are obtained at least in part from renewable starting materials.

7. The composition of claim 6, comprising a quantity of biocarbon of at least 1%, which corresponds to a $^{14}C/^{12}C$ isotopic ratio of at least $1.2 \times 10^{-14}$.

8. The composition of claim 7, comprising a quantity of biocarbon of more than 5%.

9. The composition of claim 1, further comprising at least one agent improving the surface conductivity selected from: hygroscopic agents, fatty acids, lubricants, metals, metallic films, metallic powders, metallic nanopowders, aluminosilicates, amines, esters, fibers, carbon black, carbon fibers, carbon nanotubes, polyethylene glycol, intrinsically conductive polymers, masterbatches, and mixtures thereof.

10. The composition of claim 1, further comprising at least one additive and/or adjuvant selected from organic or inorganic fillers, reinforcing agents, plasticizers, antioxidants, UV screens, flame retardants, carbon black, carbon nanotubes; mineral or organic colorants, pigments, colorants, unmoulding agents, lubricants, foaming agents, shock resistant agents, shrink resistant agents, nucleating agents, and mixtures thereof.

11. The composition of claim 1, wherein the polyamide block comprises PA 11.

12. The composition of claim 1, wherein the composition has a haze value less than 4%.

13. A transparent antistatic composition based on a polymethyl methacrylate (PMMA) polymer, comprising:
   70% to 93% by weight of the PMMA polymer, wherein the PMMA polymer is modified with a PMMA organic additive selected from the group consisting of lubricants, UV stabilizers, thermal stabilizers or mixtures thereof; and
   7% to 30% by weight of at least one polyamide (PA) block-containing and polyether (PE) block-containing copolymer (PEBA) comprising polyethylene glycol (PEG),
   with respect to the total composition weight,
   wherein said copolymer comprises about 60% by weight of PEG with respect to the total weight of copolymer; and
   wherein the composition does not contain an organic salt,
   wherein the composition possess a surface resistivity of less than $10^{12}$ ohm/square measured in accordance with the standard ASTM D257,
   in which said copolymer is selected from: PA6-PEG, PA11-PEG, PA12-PEG, PA10.10-PEG, PA10.12-PEG and mixtures thereof,
   wherein the composition has a haze value less than 10%.

14. A transparent antistatic composition based on a polymethyl methacrylate (PMMA) polymer, comprising:
   80% to 85% by weight of the PMMA polymer, wherein the PMMA polymer is modified with a PMMA organic additive selected from the group consisting of lubricants, UV stabilizers, thermal stabilizers or mixtures thereof; and
   15% to 20% by weight of at least one polyamide 11 (PA11) block-containing and polyether (PE) block-containing copolymer (PEBA) comprising polyethylene glycol (PEG),
   with respect to the total composition weight,
   wherein said copolymer comprises about 60% by weight of PEG with respect to the total weight of copolymer; and
   wherein the composition does not contain an organic salt,
   wherein the composition possess a surface resistivity of less than $10^{12}$ ohm/square measured in accordance with the standard ASTM D257, and wherein the composition contains 0.001% to 3% by weight of an inorganic salt, wherein the composition has a haze value less than 10%.

15. The composition of claim 13, wherein the at least one polyamide (PA) block is PA11.

* * * * *